United States Patent [19]

Ma et al.

[11] Patent Number: 4,873,128

[45] Date of Patent: Oct. 10, 1989

[54] PROCESS FOR PULTRUDING FIBER REINFORCED PHENOLIC RESIN PRODUCTS

[75] Inventors: Chen-chi M. Ma, Bartlesville, Okla.; Wen-cheng Shih, Taichung, Taiwan

[73] Assignee: National Science Council, Taiwan

[21] Appl. No.: 164,548

[22] Filed: Mar. 7, 1988

[51] Int. Cl.$^4$ .................. B05D 1/18; B29G 2/00; B29G 7/00

[52] U.S. Cl. .................. 427/434.7; 156/180; 264/137; 427/434.6

[58] Field of Search .............. 156/180; 264/137; 427/434.2, 434.6, 434.7

[56] References Cited

U.S. PATENT DOCUMENTS 4,305,770 12/1981 Stiles .................. 264/137 X
4,419,400 12/1983 Hindersinn .................. 156/180 X Primary Examiner—Michael Lusignan
Attorney, Agent, or Firm—Ostrolink, Faber, Gerb & Soffen

[57] ABSTRACT

The present invention is a process for pultruding fiber reinforced phenolic resin products, in which the phenolic resin normally has a viscosity ranging from 3,000 to 5,000 cps at 25° C. and is heated to maintain a viscosity ranging from 800 to 2,000 cps during the impregnating step. A die having a temperature profile which is particularly suitable for use in the present process is also disclosed, which has substantially three different heating temperatures along the pultrusion direction. Furthermore, a postcuring treatment for improving the mechanical and physical properties of the pultruded products is also disclosed in the present invention.

15 Claims, No Drawings

PROCESS FOR PULTRUDING FIBER REINFORCED PHENOLIC RESIN PRODUCTS

TECHNICAL FIELD OF THE INVENTION

The present invention relates to a pultrusion process for producing fiber reinforced phenolic resin products.

BACKGROUND OF THE INVENTION

Most of the pultruded fiber reinforced plastic products are made from unsaturated polyester resin and epoxy resin. Phenolic resin which is known to have excellent mechanical properties and electrical properties, especially at elevated temperatures, has been used to produce fiber reinforced products by prepreging, compounding or reaction injection molding processes, but phenolic resin used as a binder in a pultrusion process is not considered to be feasible due to its slow curing rate, and due to the side product (e.g. water) which may be generated causing void and defects.

U.K. patent No. 1,363,227 discloses a modified phenolic resole resin prepared from a phenol-aldehyde condensation product, a glycol and an acid catalyst, in which the glycol is presented in the final product in an amount of about 12 to 35% by weight based on weight of the phenol-aldehyde condensation product. The modified phenolic resole resin has an improved curing rate at a lower curing temperature.

U.S. patent 4,419,440 discloses fiber reinforced phenolic resin products prepared by a pultrusion process, in which a liquid phenolic resin, essentially the same as the modified phenolic resole resin taught by above said U.K. patent, having a viscosity in the range of about 500 to about 4,000 centipoises at 23° C. is used to impregnate the filaments. The spirit of the invention disclosed by this U. S. patent as stated in lines 10 to 14 of column 4 in its specification is "The low viscosity aids in processing the liquid phenolic resin and filament strands through the extrusion step in the production of filament-reinforced products in the invention." Therefore the liquid phenolic resin used is maintained at a relative low degree of cross linking and is modified in order to have the low viscosity, i.e. 500 to 4,000 cps at 23° C., preferably 800 to 3,000 cps. Consequently, the heating temperature of the pultrusion die is kept at a relative high temperature and the pulling rate of resin-filament composite is limited to a relative low value in order to cure the in-situ the phenolic resin to a sufficient extent. Furthermore, if the pulling rate is higher than the limit value, water contained in the liquid phenolic resin as a side product of the phenol-aldehyde condensation reaction will quickly expand right after the resin-filament composite exits from the heated pultrusion die and causes the pultruded products to become hollow or full of voids. Example 3 of U.S. Pat. No. 4,419,400 is found to have a pulling rate of 12 inch/minute.

The present invention is a process for pultruding fiber reinforced phenolic resin products comprising the steps of drawing a plurality of continuous filaments through an impregnating bath of liquid phenolic resin to wet-out the filaments with said resin and a squeeze orifice for removal of excess resin and air, and continuously pulling the resin-filament composite through a pultrusion die to heat and cure said resin, characterized in that the liquid phenolic resin normally has a viscosity ranging from 3,000 to 5,000 cps at 25° C. and is heated to have a viscosity ranging from 800 to 2,000 cps during the impregnating step.

The viscosity of liquid phenolic resin used in the present pultrusion process has a value significantly higher than the one suggested by U.S. patent 4,419,400 which means the phenolic resin used in the present invention has been crossed linked to a higher degree, which permits the resin impregnated filament to be sufficiently cured under less severe conditions compared to the process of U.S. patent 4,419,400, i.e. under a lower curing temperature and/or a higher pulling rate. Use of a phenolic resin hasing a viscosity ranging from 3,000 to 5,000 cps, preferably 3,500 to 5,000 cps, is not possible for impregnating the filaments according to the teaching of U.S. patent 4,419,400. The phenolic resin used in the present process is heated for obtaining a lower viscosity during the impregnating step to wet-out the reinforcement filaments. Accordingly, a process for pultruding fiber reinforced phenolic resin products disclosed by the present invention will have a pulling rate higher than any known process.

Advantageously, the pultrusion die used in the present process is designed to have multiple different heating temperatures along the pultrusion directions, e.g. three heating zones, in which the first heating temperature. i.e. near the entrance of the pultrusion die, is kept at a temperature high than 100° C. in order to repel water contained in the phenolic resin and the third heating temperture is kept at a temperature lower than the second heating temperture to prevent from the water vaporizing and expanding inside the pultruded products at the exit of the pultrusion die.

Additionally, a postcuring treatment may be optionally employed to phenolic resin products for improving their physical and mechanical properties, which comprises heating the pultruded products at a temperature of about 100° C. for more than 12 hours or a temperature of about 200° C. for about 1-2 hours to achieve the best results.

DETAIL DESCRIPTION OF THE INVENTION

The phenolic resins used in the practice of the present invention is prepared by cross linking a phenolic resole resin with an addition of an acid catalyst until the resulting phenolic resin has a viscosity ranging from 3,000 to 5,000 cps at 25° C., the viscosity is measured according to the method of ASTM D2393 with a Brookfield type viscometer. The preparation of a phenolic resole resin is well known in the art, such as the process described in U.S. Pat. No. 4,419,400, the disclosure of which is incorporated herein by reference. A preferred type of phenolic resole resin is a phenol-formaldehyde resole resin which has a free formaldehyde content about 10 wt % and a solid content about 60 wt %, and its viscosity ranges from 100-250 cps at 25° C.

The acid catalyst, also known as curing agent, is well known in the art, including the organic acid catalysts disclosed in U.K. patent 1,363,277, details thereof are incorporated by reference. A preferred catalyst is selected from the group consisting of p-toluenesulfonic acid, phenolsulfonic acid, and phosphoric acid. The amount of said catalyst used ranges from 2 to 10 wt % based on the weight of the phenolic resole resin and, preferably ranges from 4-8 wt %. The cross linking reaction is preferably carried out at a temperature ranging from 70 to 100° C., more preferably 85°-95° C., for a period of about 12 hours or more. Generally, the resulting phenolic resin will contain less than about 2% of the free formaldehyde and have about 85% of solids.

During the preparation of said phenolic resin, an oligomeric polyol may be added into the phenolic resole resin to modify the resulting reaction product. Suitable oligomeric polyols are disclosed in U.S. Pat. No. 4,419,400, and the amount of said oligomeric polyols added is less than 15 wt % based on the weight of the phonolic resole resin, preferably less than 10 wt %, more preferably less than 5 wt %. As it is well known in the art, a coupling agent such as silanes may be added into the phenolic resole resin to improve the coupling between the filaments and the resin. Also mineral fillers such as talc, silica, and clay etc. may be added into the resulting phenolic resin in order to improve the mechanical properties of the pultruded products.

The phenolic resin obtained from said cross linking reaction is maintained at an elevated temperature such that the viscosity of the phenolic resin decreases to a value ranging from 800 to 2,000 cps, preferably 1,200 to 1,500 cps, during the impregnation step. As it is well known to those skill in the art, in general, the viscosity of a liquid resin will decline as the temperature rises, but the viscosity will increase during the heating period. In one of the preferred embodiments of the present invention, the initial viscosity of the phenolic resin contained in an impregnating bath of 55° C. is 1,300 cps, and it increases to about 1,660 cps after a period of 4 hours, and about 2,000 cps after a period of 8 hours; i the temperature of the bath is maintained at 90° C., the viscosity will increase from the initial 1,000 cps to about 2,000 cps for a period of 4 hours. Therefore the temperature of the impregnating bath may be controlled according to the dimension and the profile of the product, and the formulation of the phenolic resin used. Generally it is less than 100° C.

The continuous filaments may be employed in various forms such as strand, roving, woven roving, cloth, and mat. Various filamentary materials may be used in producing the products of the invention such as glass, carbon, aromatic polyamides, ceramic, metal and hybrid therof.

The pultrusion die which functions to form and cure the fiber reinforced composite is well known in the art as described in U.S. patent 3,244,784, the disclosure of which is incorporated herein by reference. Normally, the temperature of the pultrusion die is higher than fiber reinforced composite about 10 to 20° C. because of the short residence time of the composite in the die. The dimension and profile of the pultuded products also affect the heating temperature of the pultrusion die. In one of the preferred embodiments of the present invention, the heating temperature profile of a 82-cm long, 1.27-cm wide and 0.319-cm thick curing die is controlled to have three different heating temperaturees along the pultrusion direction. Among the three heating temperatures, the second heating temperature is the highest, which ranges from 160°-210° C., preferably from 170°-190° C., the first heating temperature, i.e. near the entrance of the pultrusion die, is higher than 100° C., preferably ranges from 140°-170° C., and the third heating temperature ranges from 140°-190° C., preferably 150°-180° C. Because the phenolic resin used in the present process has been cross linked to a higher degree compared to the one used in U.S. patent 4,419,400, said first heating temperature can to be kept at a temperature higher than 100° C. in order to repel the water contained in the phenolic resin, and said third heating temperature is also able to be kept at a temperature lower than the second heating temperature to prevent from the water vaporizing and expanding inside the pultruded products at the exit of the pultrusion die.

The pultruded phenolic resin products may be optionally subjected to a postcuring treatment to improve their physical and mechanical properties. The postcuring treatment is carried out by heating the pultruded products at a temperature of about 100° C. for more than 12 hours, preferably about 24 hours, or at a temperature of about 200° C. for 1-2 hours.

The apparatus suitable for practising the process of the invention is disclosed in U.S. patent 3,244,784, the disclosure of which is incorporated herein by reference.

The invention will be further illustrated by the following examples in which parts and pecentages are by weight unless othewise indicated. The following examples are only meant to illustrate the invention, but not to limit it.

EXAMPLE 1

(I) Preparation of the impregnating phenolic resin

The impregnating phenolic resin is prepared according to the formula listed int the following Table 1, in which the constituents (2),(3), and (4) are added into the constituent (1) with stirring, the mixture is kept at 90° C. for 24 hours, and then the constituent (5) is mixed with the reacted mixture thoroughly, when the mixture is still hot.

TABLE 1

| constituent | weight (gram) |
| --- | --- |
| (1) phenolic resole resin | 1,300 |
| (2) p-toluenesulfonic acid | 65 |
| (3) polypropylene glycol | 65 |
| (4) coupling agent | 13 |
| (5) talc + silica | 130 |

(1. Phenol resole resin is a commercial phenol-formaldehyde resole resin having a free formaldehyde content of 60 wt %, a solid content of 60% and a viscosity ranging from 100-250 cps at 25° C., and sold under a code of PF-650 from Chang Chun Plastics Co. Ltd., Taiwan, R.O. China.

(3) Polypropylene has a molecular weight of 200-300.

(4) Coupling agent is gamma-amina propyltriethoxy silane from Union Carbide Corporation, U.S.A, under a code of A-1100.

(5) Talc has a sp. gr. of 2,71, and silica has a sp. gr. of 2.1.

(II) Pultrusion 26 strands of Nittobo RS-240 glass fiber roving are drawn into a bath of above said impregnating phenolic resin which is kept at 55° C. and through a 82-cm long, 1.27-cm wide and 0.319-cm thick curing die. Three sets of individaully controlled electrical plate heaters are installed on both top and bottom of the die, where the first and the third set of plate heaters have a length of 15 cm, and the second set of plate heater has a length of 40 cm.

(III) Test specimens of the pultruded products

The glass fiber content of the final pultruded product is in amount of about 56 to 65 % by volume. The glass fiber reinforced phenolic resin products pultruded according to above said process by different pulling rates and different curing temperature profiles are tested according to the method of ASTM D790 to obtain their flexural strength and, the data are tabulated in the following Table 2.

TABLE 2

| | Flexural Strength ($\times 10^4$ psi) | | | | | |
|---|---|---|---|---|---|---|
| | Pulling Rate (cm/minute) | | | | | |
| Die temperature | 10 | 30 | 50 | 70 | 90 | 110 |
| 150–210–190° C. | 10.1 | 9.8 | 4.4 | — | — | — |
| 160–190–170° C. | 9.35 | 8.5 | 7.31 | 6.39 | 4.92 | 2.9 |
| 160–180–170° C. | 9.27 | 7.98 | 7.28 | 6.20 | 4.92 | 2.3 |
| 150–160–140° C. | 3.9 | 2.94 | 2.3 | 1.6 | 1.2 | 1.15 |

The products pultruded by a curing temperature higher than 200° C. and a pulling rate higher than 70 cm/min. are found not suitable for testing due to the expansion of the products.

(IV) Postcuring

The products pultruded by a curing temperature profile of 160°–190°–170° C. and a pulling rate of 110 cm/min. are further subjected to postcuring treatments at different postcuring temperatures and for different postcuring periods. The flexural and impact strength of the postcured products are listed in the folliwng Table 3, wherein the impact strength is obtained according to the test method of ASTM D256.

TABLE 3

| | Flexural and Impact Strength | | | | |
|---|---|---|---|---|---|
| Postcuring | Postcuring Time (hour) | | | | |
| Temperature (°C.) | 1 | 6 | 12 | 18 | 24 |
| 50 | 2.24[a] | 2.37 | 2.71 | 3.11 | 3.36 |
| | (19)[b] | (19.8) | (19.2) | (19.8) | (19.2) |
| 100 | 4.76 | 5.62 | 7.01 | 7.47 | 8.03 |
| | (20.6) | (35.7) | (40.01) | (42.1) | (46.2) |
| 150 | 6.32 | 6.26 | 6.12 | 6.26 | 6.51 |
| | (27.2) | (28.1) | (28.3) | (29.8) | (29.1) |
| 200 | 6.43 | 5.7 | 6.48 | 6.52 | 5.5 |
| | (35.8) | (27.9) | (29) | (3.02) | (32) |

(a) Flexural strength ($\times 10^4$ psi)
(b) Impact strength (ft-lb/in)

A comparison of the dielectric constant at different temperatures between pultruded products and unpostcured pultruded products is shown in the following Table 4, wherein the dielectric constants are determined according to the method of ASTM D-150.

TABLE 4

| | Dielectric Constants | | | |
|---|---|---|---|---|
| | Temperature (°C.) | | | |
| Products | 30 | 50 | 100 | 150 |
| postcured | 4.18 | 4.24 | 4.56 | 4.88 |
| unpostcured | 6.49 | 6.72 | 9.37 | 10.1 |

As it can be seen from Table 3, that the preferred postcuring treatment is carried out under 100° C. for 24 hours. Furthermore, the data of Table 3 and Table 4 show that the postcured pultruded products will have improved mechanical and electrical properties.

We claim:

1. A process for pultruding fiber reinforced phenolic resin products which comprises drawing a plurality of continuous filaments through an impregnating bath of liquid phenolic resin to saturate the filaments with said resin and a squeeze orifice for removal of excess resin and air, and continuously pulling the resin filament composite through a pultrusion die to heat and cure said resin, characterized in that the liquid phenolic resin normally has a viscosity ranging from 3,000 to 5,000 cps at 25° C. and is heated to 45°–65° C. to have a viscosity ranging from 800 to 2,000 cps during the impregnating step, wherein the pultrusion die has at least three zones therein and the last zone has a temperature below the temperature of a preceding zone.

2. A process in accordance with claim 1 wherein said liquid phenolic resin has a viscosity ranging from 3,500 to 5,000 cps at 25° C.

3. A process in accordance with claim 1 wherein said liquid phenolic resin is prepared by cross linking a phenolic resole resin with an addition of an acid catalyst.

4. A process in accordance with claim 3 wherein said phenolic resole resin has a viscosity ranging from 100 to 250 cps at 25° C.

5. A process in accordance with claim 3 wherein said acid catalyst is selected from the group consisting of p-toluenesulfonic acid, phenolsulfonic acid, and phosphorous acid.

6. A process in accordance with claim 3 wherein an amount of less than 15 wt % based on the weight of said phenolic resole resin of polyols having a molecular weight of 200–400 is added to said phenolic resole resin.

7. A process in accordance with claim 1 wherein said liquid phenolic resin contains a minor portion of conventional coupling agent and mineral fillers.

8. A process in accordance with claim 1 wherein said pultrusion die has three different heating temperatures ranging from 140 to 210° C. along the pultrusion direction, and among the three heating temperatures the second heating temperature is the highest.

9. A process in accordance with claim 8 wherein the first heating temperature of said pultrusion die, which is near the entrance of said pultrusion die, ranges from 140 to 170° C., and the second heating temperature ranges from 150 to 200° C., and the third heating temperature ranges from 140 to 190° C.

10. A process in accordance with claim 1 wherein said continuous filaments have a form selected from the group consisting of strand, rovings, woven roving, cloth and mat.

11. A process in accordance with claim 1 wherein said continuous filaments is made of a material selected from the group consisting of glass fiber, carbon fiber, aromatic polyamide fiber, ceramic fiber, metal fiber and hybrid fiber thereof.

12. A process in accordance with claim 1 wherein said process further comprises a postcuring treatment for the pultruded products.

13. A process in accordance with claim 12 wherein said postcuring treatment comprises heating the pultruded products at a temperature of about 100° C. for a period longer than 12 hours.

14. A process in accordance with claim 13 wherein said period is about 24 hours.

15. A process in accordance with claim 12 wherein said posturing treatment comprises heating the pultruded products at a temperature of about 200° C. for a period of 1–2 hours.

* * * * *